United States Patent [19]

Guerrero

[11] Patent Number: 4,950,986

[45] Date of Patent: Aug. 21, 1990

[54] MAGNETIC PROXIMITY SENSOR FOR MEASURING GAP BETWEEN OPPOSED REFINER PLATES

[75] Inventor: Hector N. Guerrero, Simsbury, Conn.

[73] Assignee: Combustion Engineering, Inc., Windsor, Conn.

[21] Appl. No.: 212,263

[22] Filed: Jun. 27, 1988

[51] Int. Cl.[5] .......................... G01B 7/14; B02C 23/00
[52] U.S. Cl. .......................... 324/207.19; 324/207.15; 324/207.22; 324/207.26; 324/226; 241/33
[58] Field of Search ............... 324/207, 208, 226, 239; 241/30, 33, 37, 259.2

[56] References Cited

U.S. PATENT DOCUMENTS

| | | |
|---|---|---|
| 2,548,599 | 4/1951 | Garr . |
| 3,799,456 | 3/1974 | Jewell et al. . |
| 3,944,146 | 3/1976 | Stockmann et al. . |
| 4,073,442 | 2/1978 | Virving . |
| 4,251,035 | 2/1981 | Chatwin et al. . |
| 4,387,339 | 6/1983 | Akerblom . |
| 4,447,011 | 5/1984 | Prew . |
| 4,454,991 | 6/1984 | Brenholdt ........................ 241/30 |
| 4,683,427 | 7/1987 | Durum .............................. 324/207 |

FOREIGN PATENT DOCUMENTS 849716 8/1970 Canada .
8803054 5/1988 Int'l Pat. Institute .

*Primary Examiner*—Reinhard J. Eisenzopf
*Assistant Examiner*—Walter E. Snow
*Attorney, Agent, or Firm*—Chilton, Alix & Van Kirk

[57] ABSTRACT

A gap sensor comprising a C-type core (38, 62, 126) wrapped with a coil (44, 68, 130), and arranged to be responsive to the variable reluctance in a magnetic circuit passing through the core, two refiner plates (28a, 28b, 194, 198) and the gap (34, 90) between the plates. The two sensing ends (134, 136) of the transducer core legs (128, 132) are positioned in close proximity to the circumferential surfaces, or rims (82, 86, 212, 214) of the two spaced apart refiner plates, respectively. The magnetic field generated by the coil follows a magnetic path or circuit including the core (38), the radial gaps (46), between the sensor and the discs (16, 18), the refiner disc material, the plates (28a, 28b) mounted on the disc, and the clearance gap (34) between the two refiner plates.

13 Claims, 10 Drawing Sheets

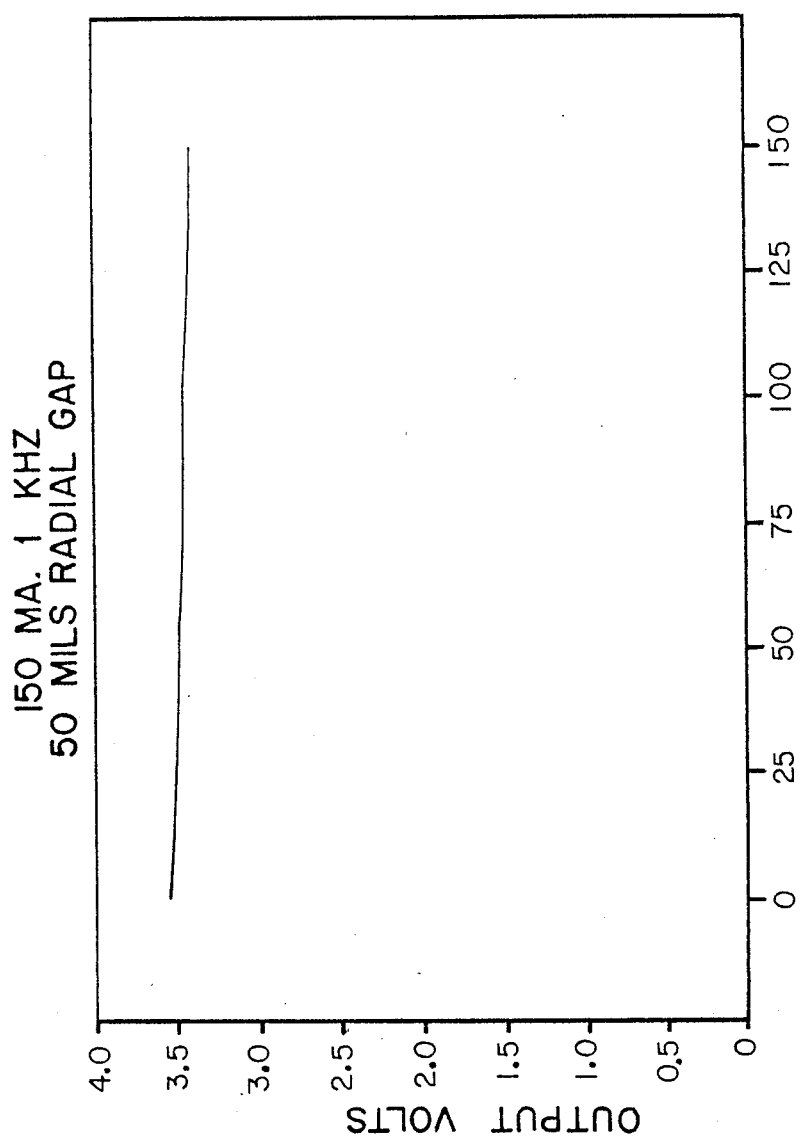

MAGNETIC PROXIMITY SENSOR FOR MEASURING GAP BETWEEN OPPOSED REFINER PLATES

BACKGROUND OF THE INVENTION

The present invention relates to an apparatus and method for monitoring the clearance between the refining surfaces of relatively rotating discs or plates, for refining fibrous cellulosic material.

In paper pulp refiners, wood chips are broken down into fibers suitable for the manufacture of paper, by the grinding action of two opposed, relatively rotating refiner discs. The refiner discs carry serrated surface refiner plates made of a white cast iron material. In traversing the clearance gap between the two refiner plates, the wood chips are mechanically reduced into fibers in the radially inner first stage breaker bar section, and the fibers are further processed by refiner plates at the radially outer region of the discs where the gap is very narrow.

The operation of the refiner requires close control of the clearance gap between the two refiner plates. If the gap is too large, inefficient refining and high expenditure of energy result. If the gap is too narrow, undesirable fiber interaction with the plate occurs, and the fibers are undesirably cut and shortened. Transients such as start up and changes in feed rate can also cause clashing of the refiner plates, thus leading to reduced plate life.

A variety of techniques have been known for the purpose of monitoring clearance gaps in process equipment. In U.S. Pat. No. 4,454,991, an AC impedance measurement method is described, wherein a high frequency signal is applied across the gap and the change in impedance associated with a change in gap is indicative of gap clearance.

In U.S. Pat. No. 4,447,011, a pressure transmitter technique is described, wherein a control signal is achieved by a counter-force produced in opposition to the force produced by the refiner drive.

In U.S. Pat. No. 4,387,339, a variable reluctance technique is described, wherein the probe in imbedded in one of the discs. Opposite polarity coils are used, in which the magnetic circuits include the gap. Opposing surfaces, which are sensed by the Hall effect, are nulled. The difference between the coil currents is then measured.

In U.S. Pat. No. 4,251,035, a capacitance technique is described, wherein the movement of gyrator crusher jaw is sensed by a capacitance measurement across hydraulic fluid between a shaft member and its support.

In U.S. Pat. No. 4,073,442, a direct current technique is described, whereby a constant voltage is applied and the resulting current across the gap is measured.

U.S. Pat. No. 3,944,146, describes an ultrasonic technique employing transducers which receive signals reflected from a reflector plate, thereby directly measuring the gap setting in a crusher.

U.S. Pat. No. 3,799,456 describes a technology in which the movement of the control shaft, by which one of the relatively rotating plates is axially adjusted, is monitored by an LVDT.

In Canadian Pat. No. 849,716, an inductance technique is described, wherein six coils are carried on one disc and a single magnet is carried on the other. The magnitude of the signal induced in the coils is a measure of local clearance distance.

As practical applications in pulp refiners, the LVDT technique of U.S. Pat. No. 3,799,456 has proven unreliable due to three significant factors. First, thermal expansion during start up causes an unknown differential length change in the disc shaft and base. Second, deflections of the refiner disc peripheral regions due to high pressures generated in the grinding process, are not necessarily manifested in the shaft movement. Finally, measurements of shaft length changes do not take into account wear of the refiner plates.

The variable reluctance technique described in U.S. Pat. No. 4,387,339 provides a direct means of measuring the gap between the plates and is, in that sense, an improvement over the LVDT technique. However, because the transducer is imbedded in a rotating member, the installation of the device and the transmission of power and electrical signals are very complicated. The device is also subjected to high accelerations and failure of its mechanical parts is highly probable. Frequent replacement of the transducer is also necessary since the transducer is subjected to the erosive and corrosive environment of the pulp slurry.

SUMMARY OF THE INVENTION

It is an object of the present invention to provide apparatus and method for measuring the dynamically changing clearance gap between refiner discs, without subjecting the measuring device to the dynamic forces associated with rotation of the discs.

It is a further object of the invention that the wear of the refiner plates should have no significant effect on the measurement accuracy of the gap clearance.

It is a further object of the invention that the measuring apparatus be easily retrofitted to existing facilities.

These and other objects and advantages are accomplished in accordance with the present apparatus and method, by providing a gap sensor comprising a C-type core wrapped with a coil, and arranged to be responsive to the variable reluctance in a magnetic circuit passing through the core, the refiner plates, and the gap between the plates. The two sensing ends of the transducer core legs are positioned in close proximity to the circumferential surfaces, or rims, of the two spaced apart refiner discs, respectively. The magnetic field generated by the coil follows a magnetic path or circuit including the core, the radial gaps between the sensor and the discs, the refiner disc material, the plates mounted on the discs, and the clearance gap between the two refiner plates. The reluctances of the core and the metal components in the magnetic circuit are small in comparison to the clearance and radial gaps.

In accordance with the preferred embodiment of the invention, the variations in the radial gaps due to thermal expansion and the like, are small and can be compensated. Consequently, the reluctance of the magnetic circuit depends primarily upon the clearance gap between the disc plates. Changes in the clearance gap lead to changes in magnetic field, which can be measured as a change in coil inductance. Preferably, the flux change is measured with a secondary coil. An alternating current is passed through the primary coil and the induced current in the secondary coil provides a way of measuring the variations in gap reluctance.

Changes in the radial clearance between the transducer and the disc may occur due to differential thermal expansion of the discs and the refiner casing during start up. Such changes can be compensated by a balancing arrangement wherein a third, compensation leg of the core, and another secondary (compensation) coil associated with the third leg, are integrated with the basic sensor. The sensing end of the third leg is brought into close proximity to the disc rim adjacent to the core primary leg, with the same radial gap. The output of the secondary coil on the second leg is a function of its radial gap and the clearance gap. The output of the compensation coil is a function of the radial gap alone. The outputs of the secondary and compensation coils are connected differentially, which eliminates the effect of changes in the radial gap. This self compensated sensor system has several advantages as compared to the basic system having only a secondary coil, including higher sensitivity, higher accuracy, less susceptibility to external magnetic fields, temperature changes and variations in supply voltage and frequency.

In yet a further embodiment of the invention, appropriate calibration prior to start up can eliminate the need for using a three legged transducer core. Operation of the two legged sensor at a high frequency of, for example, 1000 Hz, enables the radial gap to be actually measured. At this frequency, the sensor response to a change in radial gap, is negligibly affected by changes in the clearance gap. Thus, if calibration curves for the clearance gap are obtained for various radial gaps at low frequency (100–200 Hz), then a high frequency calibration (radial gap) will determine which of these calibration curves (low frequency) will be used to measure the clearance gap.

In a preferred apparatus embodiment of the sensor, a substantially C-shaped core having a base portion and first and second spaced apart legs, each projecting from the base, and each having a free end, is encased within a housing. The base portion of the core is wrapped with an electrically conducting coil, having leads which penetrate through the housing, for energizing the coil at a selected frequency to produce a varying magnetic field in the core. A spring or other structure is provided for maintaining the free ends of the first and second legs of the core in contact with respective pads, which are preferably sealed to the housing to isolate the core from the harsh environment within the refiner. Signal generating and processing devices are coupled to the leads for energizing the coil, for sensing variations in the reluctance in the core resulting from variations in the material properties of the magnetic path between the first and second legs, and for displaying an appropriate indicator or measurement value to the operator.

The refiner disc clearance gap measurements made in accordance with the invention, has a number of significant advantages over conventional techniques. The wear of the refiner plates has no effect on the measurement accuracy since the reluctance of the gap is uneffected. The stationary installation of the sensor is simpler and less expensive than the installation of a sensor in a rotating disc. The life of the sensor is considerably longer than that of sensor located in the grinding region of the refiner plates and subjected to high mechanical stress. The sensor core can easily be protected against the corrosive and abrasive pulp slurry by encapsulation in a non-magnetic shield material. The sensor, in accordance with the invention, can easily be retrofitted to existing facilities. In addition, drifting of the measurement zone has no effect on the true measurement gap since the radial gaps and the sources of reluctance variation other than the clearance gap, remain relatively constant.

BRIEF DESCRIPTION OF THE DRAWINGS

The preferred embodiments of the invention will be described in greater detail below, with reference to the accompanying drawings, in which:

FIG. 7 is a graph showing the output voltage as a function of clearance gap at a constant radial gap, with the coil energized at a high frequency;

DESCRIPTION OF THE PREFERRED EMBODIMENT

Figure 1:
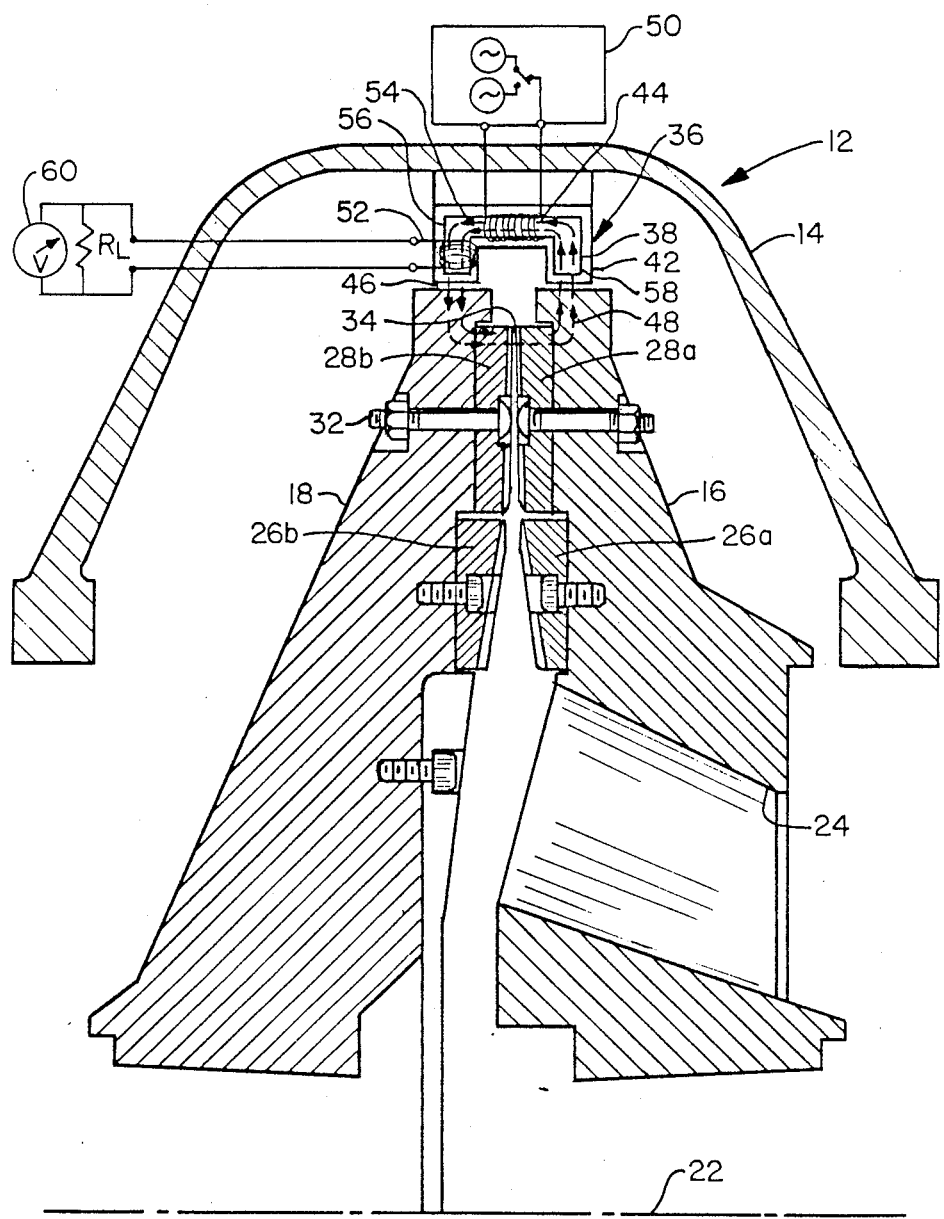
FIG. 1 is a schematic representation of the first embodiment of the invention, positioned for gap measurement in a double disc refiner.

FIG. 1 shows a first embodiment of the invention as implemented in a double disc refiner 12, having a 316 stainless steel case 14 which substantially encloses a feed disc 16 which rotates counterclockwise, and a control disc 18 which rotates clockwise, about a rotor or shaft centerline 22. The feed disc 16 has a feed slot 24 through which pulp and the like is conveyed between the discs 16, 18. Typically, the feed and control discs 16, 18, each are made of 15-5 PH stainless steel, to which are attached confronting, annular breaker plates 26a, 26b and confronting refiner plates 28a, 28b, each typically made of cast iron plate material. The plates 26, 28 are typically attached to the discs by bolts 32 or the like.

The pulp material as it is refined, moves radially outwardly through a narrowing gap between the plates 26, 28. Particularly between the confronting refiner plates 28a, 28b, the clearance gap 34 must be monitored if long life and uniform refining of the pulp material are to be achieved. A variety of factors influence the gap, including the position of the axially moveable control disc 18, the pressure and density of the feed material passing between the discs, the temperature and pressure of the environment within the refiner 12, and the extent of wear on the plate surfaces.

In accordance with the present invention, a variable reluctance gap sensor device 36 is supported by the case 14 adjacent to and spaced from the coaxial circumferential surfaces, or rims, of the feed and the control discs 16, 18. The sensor includes a C-type core 38, preferably enclosed within a stainless steel housing 42, which is exposed to the harsh environment within the refiner 12. A primary coil 44 is wound around the core 38 and activated by a switchable high frequency current source 50 so as to produce a magnetic field circuit 48 which passes through the radial gaps 46 between the sensor 36 and the discs 16, 18, and through the discs, associated refiner plates 28 and plate clearance gap 34. A variation in the size of the gap 34 between the plates 28, affects the reluctance of the magnetic field 48, and this variation in the reluctance is measured as a change in the inductance of, for example, a secondary coil 52 which is connected in parallel across a load resistor $R_L$ and voltmeter 60. In general, the sensor 36 includes a base portion 54 which is connected to the casing 14 or a liner therein, and two leg portions 56, 58, each of which is in spaced, confronting relationship with the circumferential surface of respective, relatively rotating discs 16, 18. It should be appreciated that, due to differential thermal expansion between the discs and the casing, the reluctance of the magnetic field 48 may also be influenced by changes in the radial gap 46. This influence should be accounted for by calibration or other techniques.

Figure 2:
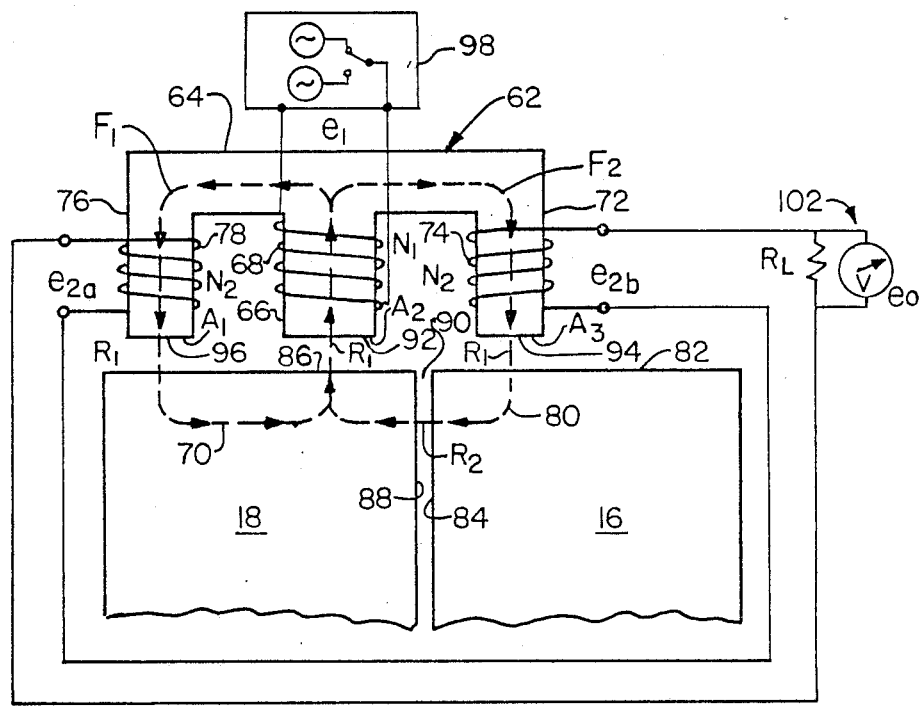
FIG. 2 is a schematic illustration of the operating principles of a second embodiment of the invention.
Figure 3:
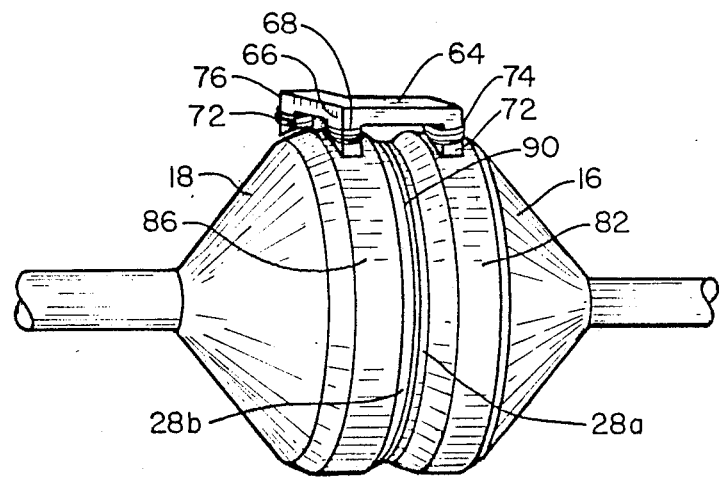
FIG. 3 is a schematic illustration of the structural characteristics of the second embodiment of the invention.

FIGS. 2 and 3 show schematically a second embodiment of the invention, in which the sensor 62 is self-compensated for variations in radial gap. In this construction, the core base 64 is actually L-shaped when viewed from above, as indicated in perspective in FIG. 3. A primary leg 66 projects downwardly above the circumferential surface 86 of disc 18, and has a primary coil 68 wound thereon, which in turn is connected to an AC power supply 98. The secondary leg 72 has a respective secondary coil 74, the second leg being spaced above the circumferential surface 82 of disc 16. The coil 74 is connected to an inductance detection and indicator circuit 102. The third, compensation leg 76 is also spaced above the circumferential surface 86 of disc 18, and includes a compensation coil 78 which is connected to circuit 102. The surfaces 92, 94 and 96 at the free ends of legs 66, 72, and 76, respectively, are machined with a cylindrical radius that conforms to the circumference of the discs, and preferably so that the surfaces 92, 94, and 96 are each the same distance from the adjacent surfaces 86, 82.

The output voltage $e_0 = e_{2a} - e_{2b}$ is the difference in the induced voltages in the secondary 74 and compensation 78 coils resulting from the respective fluxes, F1 and F2 in the two magnetic paths 70, 80. By Faraday's Law, the induced voltage e in a coil of N turns and a changing flux F is given by:

$$e = NdF/dt.$$

Thus, for given secondary coil of turns N2, and input frequency w, $$e_2 = N_2 w[F_2 - F_1]$$

The magnetic flux F and reluctance R are related respectively as follows:

$$F = NI/\Sigma R_i, \Sigma R_i = \Sigma l_i / l_i A_i, \text{ where}$$

N = number of turns in primary coil,
$I_p$ = current in the primary coil,
$R_i$ = sum of reluctances in magnetic path (Maxwells)
l = magnetic path length, (inches)
$l_i$ = permeability of magnetic path segment (English units)
$A_i$ = cross sectional area of magnetic path segment.

In a typical construction of this embodiment, the core consists of a high permeability material which may be soft iron, cast iron, transformer steel, or any other suitable material. The primary sensing leg 66 has a cross sectional area of 0.75 inch by 0.75 inch, while the secondary leg 72 and compensating leg 76 each have a cross sectional area of half this amount, e.g., 0.375 inch X 0.75 inch.

Thus, the output $e_{2b}$ of the secondary coil 74 is a function of its radial gap and the clearance gap 90 between confronting plate surfaces 84, 88. The output $e_{2a}$ of the compensation coil 78 is a function of the radial gap alone. The outputs of the secondary coil 74 and the compensation coil 78 are connected differentially, thus eliminating the effects of changes in the radial gap, as shown at 102. The secondary coil voltage $e_{2b}$ and compensating coil voltage $e_{2a}$ are connected in electrical opposition. The net induced voltage is measured by passing the net induced current through a load resistor $R_L$ and measuring the voltage across it.

Figure 4:
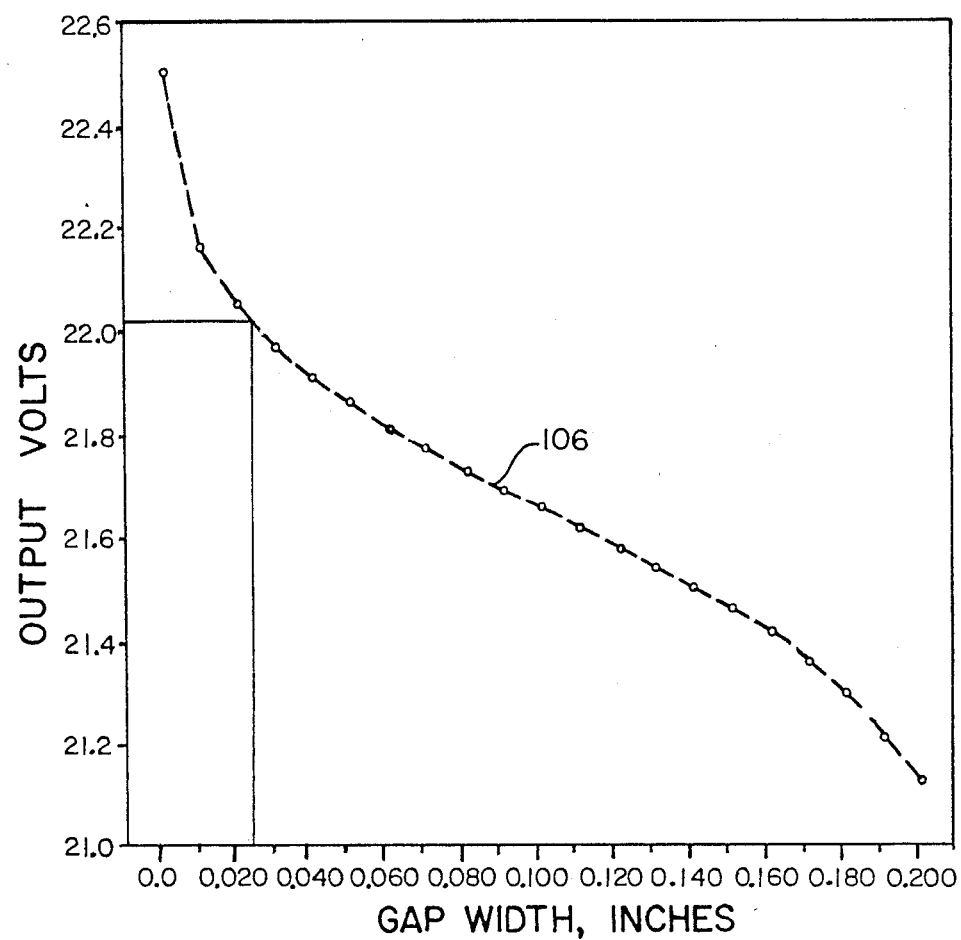
FIG. 4 is a graph showing typical output voltage for a change in clearance gap width in accordance with the first embodiment of the invention, at a constant radial gap.
Figure 5:
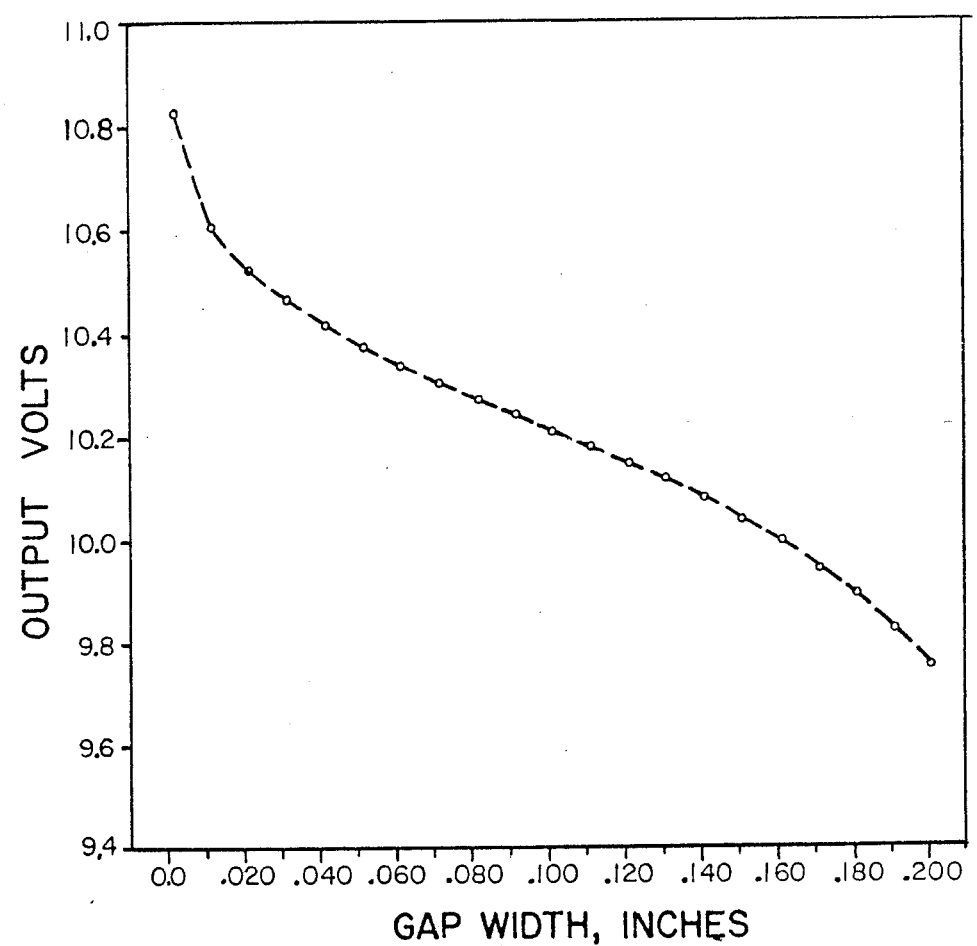
FIG. 5 is a graph similar to FIG. 4, but at a larger, constant radial gap.
Figure 6:
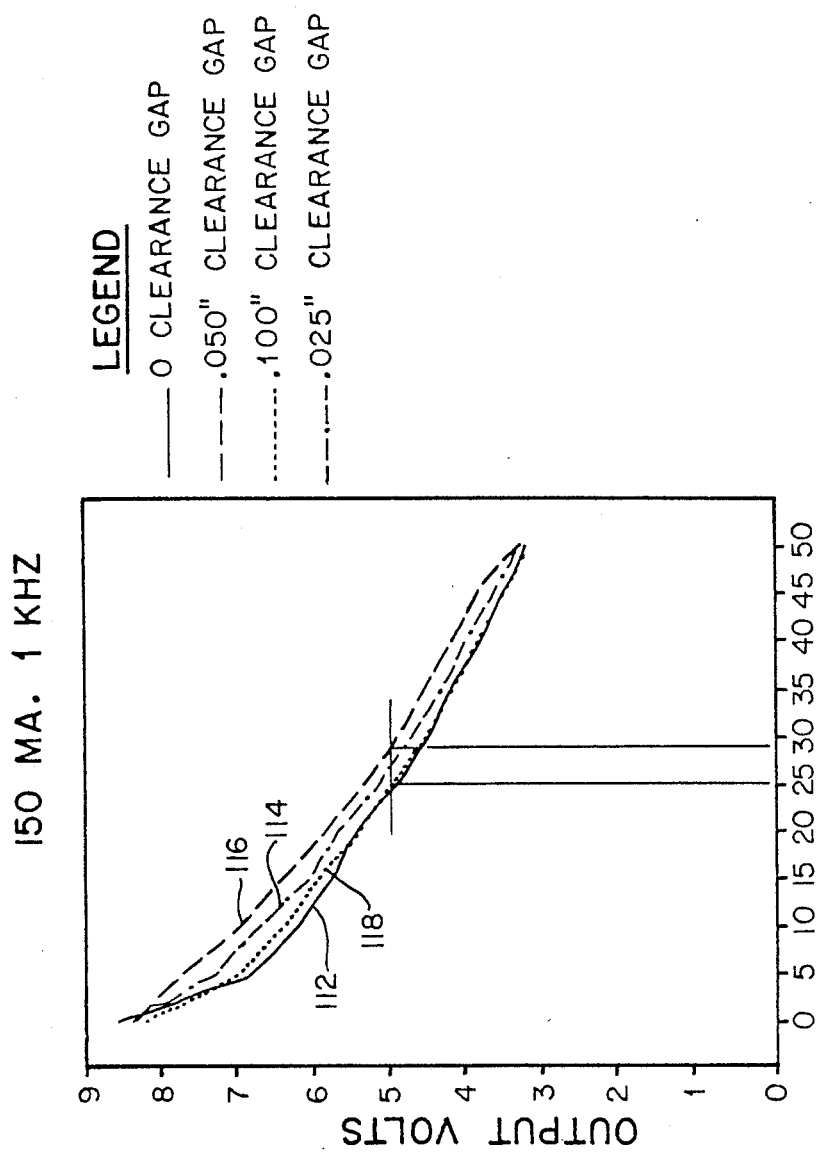
FIG. 6 is a graph showing the output voltage as function of radial gap, at four different clearance gaps, with the coil energized at a high frequency.

FIG. 4 is a graphic illustration 106 of the sensor primary coil output 106 in volts, as a function of clearance gap width, in inches, wherein the actuating frequency is 200 Hz at 800 Ma, and the radial gap is 0.025 inch for a C core probe such as shown in FIG. 1. FIG. 5 is a graph of voltage output 108 similar to FIG. 4, except that the radial gap is 0.050 inch. As shown in FIG. 6, the output voltage variations at a given radial gap, do not change significantly for various clearance gaps 112, 114, 116, 118, when the primary coil is actuated at a relatively high frequency, i.e., 1 KHz. As shown in FIG. 7, at a given radial gap of, for example, 50 mils, and actuation at one KHz, the output voltage 122 is nearly constant over a considerably variation in the clearance gap.

Thus, if calibration curves for the clearance gap are obtained for various radial gaps at a relatively low frequency (100-200 Hz), then a relatively high frequency calibration (radial gap) will determine which of these calibration curves (low frequency) will be used to measure the clearance gap. For example, using the data of the type shown in FIGS. 4-7, calibration of the sensor is performed as follows. A series of calibration measurements similar to FIG. 4 are performed at relatively low frequency (200 Hz) and given current (800 ma) at various fixed radial gaps and at intervals of 0.005 inch. A second series of calibration measurements similar to FIG. 6 are performed at higher frequency (1 KHz 150 ma) at various fixed clearance gaps (at intervals of 0.010 inch. The lower frequency is the clearance gap measurement frequency and the higher, calibration frequency is typically on the order of two to ten times the measurement frequency.

To find the unknown clearance gap at operating conditions, first impress the higher frequency source on the sensor input (150 ma at 1 KHz). An output voltage is read from the measuring instrument. From the curve in FIG. 6 with the known voltage, say 5 volts, a small range of radial gaps is indicated (0.0250.028 inch). If an average value of 0.026 radial gap is chosen, the clearance gap (assumed) is 0.025 inch. The source voltage to the primary coil is switched to 200 Hz, 800 ma and a second output voltage is measured. From FIG. 4 (actual curve for radial gap=0.0265 inch to be used), the output voltage for a clearance gap of 0.025 inch should be 22.02 volts. If this is so, then the radial and clearance gaps as assumed are correct. If not, the measured voltage is compared with various curves similar to FIG. 4 until there is a correspondence. A computer loaded with a look-up table of these values (obtained from the calibrations) will easily find the correct radial and clearance gaps by iteration. This process is similar to the algebraic solution of two equations with two unknowns. There are two unknowns (radial and clearance gaps) and two known voltage measurements at two frequencies. The iteration should converge rapidly since the clearance gap has a weak effect at high frequency.

This calibration avoids the necessity for fabricating a three legged core and, in most circumstances, would thus be the preferred embodiment.

Figure 10:
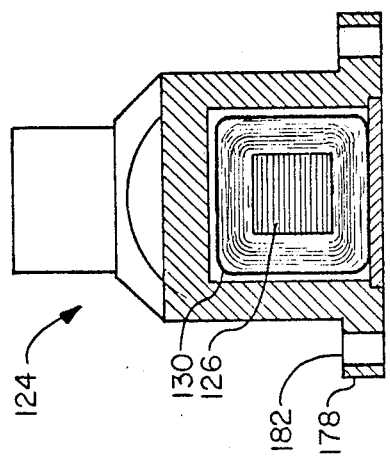
FIG. 10 is an end view, in section, of the sensor shown in FIG. 9.
Figure 8:
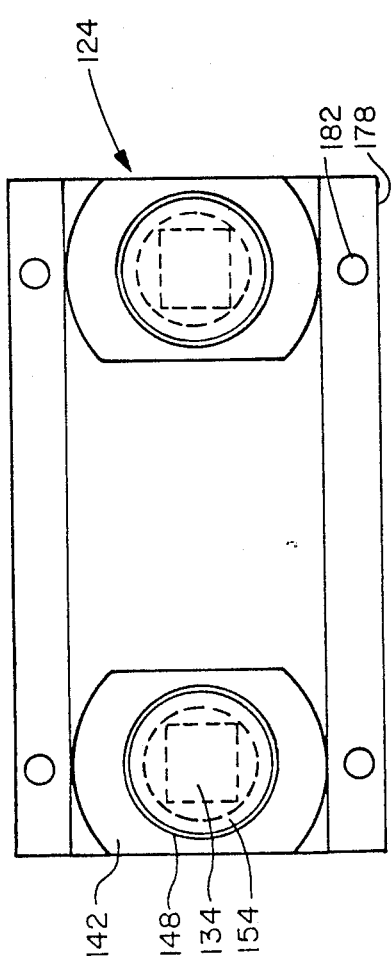
FIG. 8 is a plan view showing the preferred structure of the sensor in the first embodiment of the invention.
Figure 9:
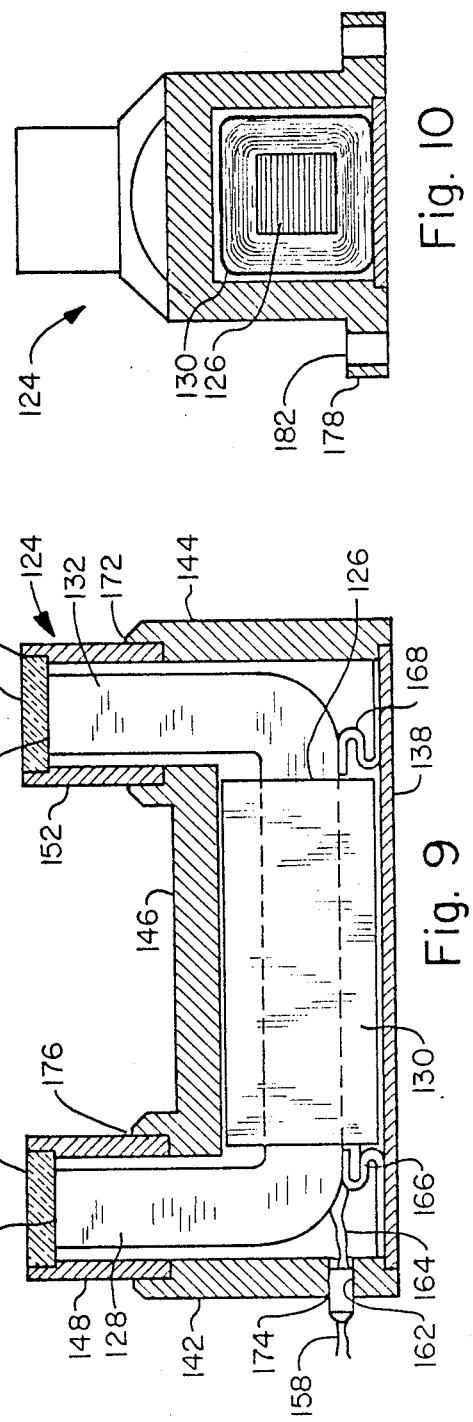
FIG. 9 is an elevation view, partly in section, of the sensor shown in FIG. 8.

FIGS. 8, 9, and 10 illustrate the detailed construction of such preferred, embodiment, wherein the third, compensation leg is avoided. The preferred sensor 124 includes a laminated C-core having a base portion 126 surrounded by coil 130, and projecting first and second legs, 128, 132, respectively. Coil 130 in practice includes primary and secondary coils wound one over the other to reduce leakage currents. Preferably, the legs 128, 132 are spaced apart at their free ends 134, 136, by approximately four inches. The core is enclosed in a 316L stainless steel housing, preferably comprising a housing base 138, first and second side walls 142, 144, a housing cover 146 spaced above the core base 126 and substantially adjacent the coil 130, and first and second leg shields 148, 152. Preferably, pads 154, 156 made of 15-5 Ph stainless steel close off the shields 148, 152 and cover the leg free ends 134, 136. The joints between the illustrated components of the housing are preferably nickel brazed, as shown at 172, 174, and 176. A mineral insulated cable 158 penetrates an aperture 162 in the housing first wall 142, such that leads 164 for the coil 130 can be connected to the external circuit 102 and indicators. Preferably, spring member 166, 168 of any suitable construction, urge the core 126 toward the pads 154, 156, to prevent the creation of gaps between the legs 128, 132 and pads, which may affect the reluctance of the magnetic path. The sensor housing may include side flanges 178 having holes 182 by which the sensor may be attached to the structure within the case 14 (FIG. 1). The entire sensor housing may be plasma sprayed with aluminum oxide ceramic coating to provide extra protection against the corrosive and erosive environment when mounted in the refiner as shown in FIG. 1.

Figure 11:
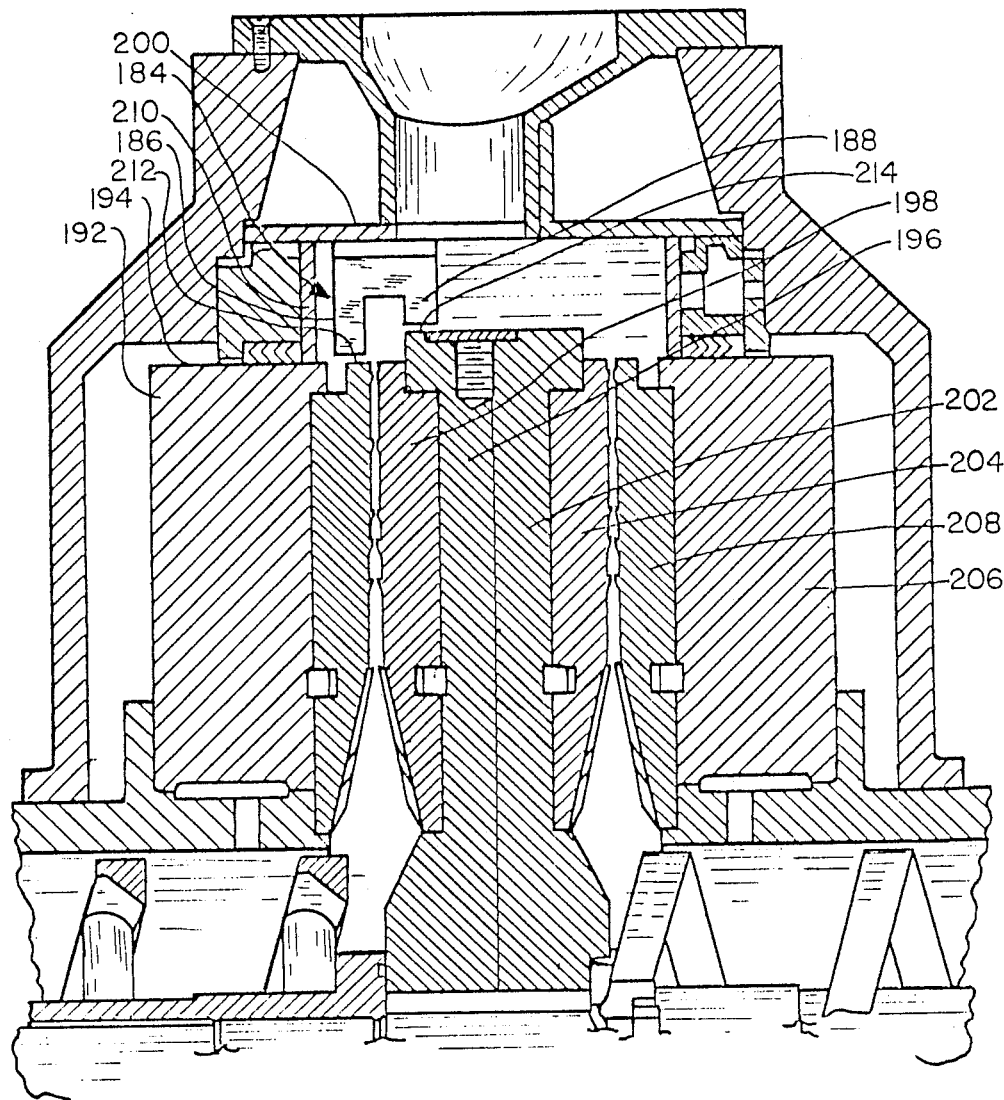
FIG. 11 is a longitudinal section view of twin refiner showing the shape and location of a variation of the first of the invention.

FIG. 11 illustrates a variation 184 in the construction of the first embodiment of the sensor, suitable for use in a twin refiner. In this construction, one core leg 186 is longer than the other leg 188 in order to accommodate the different effective radii of the stationary disc 192 an associated stationary plate 194, relative to rotating disc 196 and associated rotating plate 198. In a twin refiner, a companion rotating disc 202 is bolted to disc 196 for co-rotation therewith, and has an associated rotating plate 204 in confronting relation with stationary plate 208 which is attached to stationary disc 206. Typically, a stationary 316L stainless steel liner 200, running generally parallel to the axis of rotation of the discs 196, 202, is spaced between two and five inches from the circumferential rim 214 of the rotating discs 196, 202. A radially extending liner 210 is generally available in stationary relation to the stationary disc 192. The sensor 184 may be attached to either of these liners 200, 210, such that the leg 186 has a radial gap from the circumferential rim 212 on stationary plate 194, and the other leg 188 has the same radial gap from the circumferential rim 214 of the rotating disc 196. It can be seen that the rims of plate 194 and disc 196 are at different effective radii from the rotation axis of the shaft, and therefore the respective legs 186, 188 of the sensor 184 are of different length to maintain approximately the same radial gap.

Figure 12:
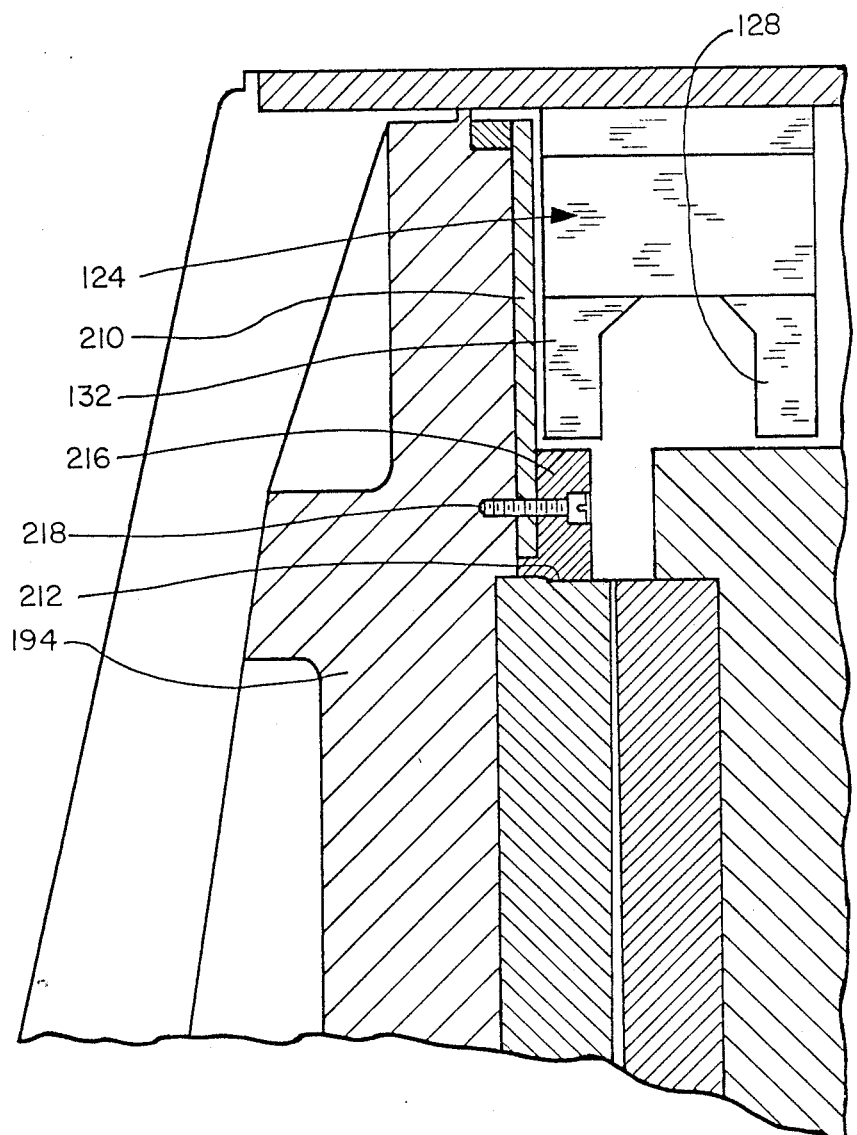
FIG. 12 shows an alternative mounting arrangement in a twin refiner for the first embodiment of the invention.

FIG. 12 shows another possible mounting arrangement for a twin disc refiner, in which the sensor 124 has first and second legs 128, 132 as shown in FIG. 9. In this arrangement, a magnetic shim 216 is fixed to liner 210 as by bolt 218, in contact with the circumferential rim 212 of the stationary plate 194, for transmission of magnetic flux to complete the required magnetic circuit.

Figure 13:
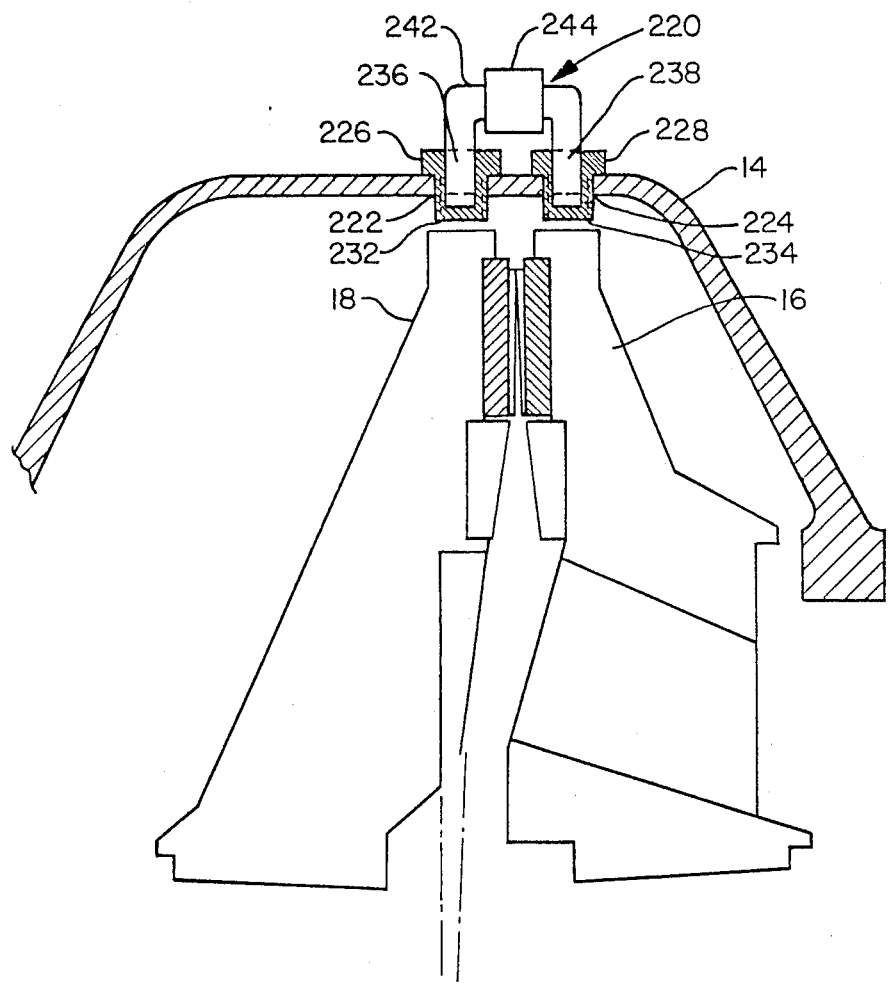
FIG. 13 shows a mounting arrangement for a sensor in a refiner having only a small space available between the disc and the refiner casing.

FIG. 13 shows another possible mounting arrangement for sensor 220, adapted for use where the radial distance between the discs 16, 18 and the refiner casing 14 is too small for the entire sensor to be contained therein. Openings 222, 224 are drilled and tapped into the casing and two stub tubes 226, 228 with closed ends 232, 234 are threaded into respective openings. The stub tubes allow the sensor core legs 236, 238 to be positioned close to the discs while being protected from the process fluid. The stub tubes with closed ends shield for the sensor, even though the sensor housing of the type shown in FIG. 9.

It should be appreciated that the terms "disc" and "plate" as used herein, normally refer to the usual refiner arrangement wherein plates having confronting, active surfaces on mounted on the substantially parallel vertical surfaces of spaced apart discs. In general, however, it should be understood that the invention can be applicable to discs without plates, or plates without discs, so that, where the context permits, the terms are synonymous.

I claim:

1. A device for measuring the clearance gap between two magnetically conductive, relatively rotating coaxial plates, the plates having circumferential rim surfaces and confronting active surfaces separated by said clearance gap, comprising:

a magnetically conductive core having a base portion, a first leg projecting from the base portion with a free end spaced radially from the rim surface of one plate, and a second leg projecting from the base portion and having a free end spaced radially from the rim surface of the other plate;

an electrically conductive coil wrapped around the core;

an AC power source for activating the coil with a primary voltage signal to induce a primary magnetic flux path through the core, through said radial spaces, through the plates and through said clearance gap; and means coupled to the core and responsive to changes in reluctance of the flux path, for indicating changes in the size of the clearance gap.

2. The measuring device of claim 1, further including a third leg projecting from the core base portion and having a free end spaced radially from the rim surface of said one plate and forming another magnetic flux path between the first leg and the third leg which passes through said one but not the other of said plates; and wherein said means for indicating includes
  a secondary coil associated with the second leg, in which secondary coil a secondary voltage is induced by the power source,
  a compensation coil associated with the third leg, in which compensation coil a compensation voltage is induced by the power source, and
  means responsive to the difference between the second and compensation voltages for generating an output signal indicative of changes in the clearance gap compensated for changes in the radial space.

3. The measuring device of claim 1, wherein said means for indicating includes,
  a secondary coil wrapped around the core, in which secondary coil a secondary voltage is induced by the power source, and
  means responsive to changes in the secondary voltage for generating an output signal indicative of changes in the clearance gap.

4. The measuring device of claim 1, wherein the power source is switchable between a normal measurement frequency and a higher calibration frequency.

5. A device for measuring the clearance gap between two magnetically conductive, relatively rotating plates, comprising:
  a magnetically conductive core having a base portion and first and second spaced apart legs each projecting from the base and having a free end, wherein one leg is longer than the other leg;
  an electrically conductive primary coil wrapped around the base portion;
  a housing encasing the core and coil, the housing including first and second pad surfaces covering the free ends of the first and second legs, respectively;
  means for maintaining the free ends of the first and second legs in contact with the respective pads;
  means penetrating the housing, for energizing the primary coil at a selected frequency to produce a varying magnetic field in the core; and
  means coupled to the core, for sensing variations in the reluctance of the core resulting from variations in the magnetic path between the pads covering the first and second legs.

6. A device for measuring the clearance gap between two magnetically conductive, relatively rotating plates, comprising:
  a magnetically conductive core having a base portion and first and second spaced apart legs each projecting from the base and having a free end;
  an electrically conductive primary coil wrapped around the base portion;
  a housing encasing the core and coil, the housing including first and second pad surfaces covering the free ends of the first and second legs, respectively;
  means for maintaining the free ends of the first and second legs in contact with the respective pads;
  means penetrating the housing, for energizing the primary coil at a selected frequency to produce a varying magnetic field in the core; and
  means coupled to the core, for sensing variations in the reluctance of the core resulting from variations in the magnetic path between the pads covering the first and second legs;
  wherein the power source is switchable between a normal measurement frequency and a higher calibration frequency.

7. The measuring device of claim 6 wherein the means for sensing variations in the reluctance include,
  a secondary coil wrapped in overlapping relation with the primary coil, in which secondary coil a secondary voltage is induced by the power source, and
  means responsive to changes in the secondary voltage for generating an output signal indicative of the variations in the reluctance of the core resulting from variations in the magnetic path.

8. The measuring device of claim 6, wherein the measurement frequency is about 200 Hz and the calibration frequency is about 1000 Hz.

9. An arrangement for measuring the clearance gap between refiner plates comprising:
  a refiner casing;
  a first refiner disc supported within the casing and carrying a first refiner plate;
  a secondary refiner disc carrying a second refiner plate, the second disc and plate being supported within the casing coaxially with the first disc and plate and rotatable relative thereto, the first and second plates having confronting active surfaces defining a gap therebetween and the discs having circumferential rim surfaces facing the casing;
  a magnetically conductive core having a base portion, a first leg projecting from the base portion with a free end spaced radially from the rim surface of the first disc and a second leg projecting from the base portion with a free end spaced radially from the rim surface of the second disc;
  an electrically conductive coil wrapped around the core;
  an AC power source for activating the coil with a primary voltage signal to induce a magnetic flux path through the core, through said radial spaces, through the plates and through said gap; and
  means coupled to the core and responsive to changes in the reluctance of the flux path, for indicating changes in the size of the clearance gap.

10. The arrangement of claim 9, wherein the core is encased in a housing and the housing is mounted in a stationary position within the casing.

11. The arrangement of claim 9, further including first and second stub tubes penetrating the casing and having ends terminating in radially spared relation from the respective first and second disc rim surfaces, and wherein said core base portion is exterior to the casing and the free ends of the first and second core legs are contained within the respective first and second stub tubes.

12. A method of monitoring the gap width between two confronting refiner discs which have circumferential rim surfaces, comprising:
  positioning a sensor first leg in spaced radial relation from the rim surface of one disc and positioning a sensor second leg in spaced radial relation from the rim surface of the other disc;
  generating an oscillating magnetic flux that passes through the sensor legs, the rim surfaces, and the gap; and
  detecting changes in the reluctance associated with the magnetic flux resulting from changes in the gap width and generating an output signal commensurate with the detected changes in reluctance.

13. The method of claim 12, further including the step of calibrating the sensor by,
repositioning the discs to a plurality of known gap distances, at a constant radial spacing of the legs from the rims, generating an oscillating flux at a measurement frequency and determining a quantitative relation between the output signal and gap width,
repositioning the sensor legs at a plurality of known radial spacings from the rim surfaces, at a constant gap width, generating an oscillating flux at a calibration frequency at least twice the measurement frequency, and determining a quantitative relation between the output signal and the radial sparing; and
storing said quantitative relations, and
wherein the step of generating an output signal includes accessing the stored quantitative relations.

* * * * *